United States Patent
Shah et al.

(10) Patent No.: US 8,600,174 B2
(45) Date of Patent: Dec. 3, 2013

(54) METHOD AND SYSTEM FOR ATTACHING A METATAG TO A DIGITAL IMAGE

(75) Inventors: Alex Shah, San Diego, CA (US); Charles A. Myers, La Jolla, CA (US)

(73) Assignee: FaceDouble, Inc., San Diego, CA (US)

( * ) Notice: Subject to any disclaimer, the term of this patent is extended or adjusted under 35 U.S.C. 154(b) by 299 days.

(21) Appl. No.: 12/948,709

(22) Filed: Nov. 17, 2010

(65) Prior Publication Data

US 2011/0123071 A1 May 26, 2011

Related U.S. Application Data

(63) Continuation-in-part of application No. 12/341,318, filed on Dec. 22, 2008, and a continuation-in-part of application No. 12/555,789, filed on Sep. 8, 2009, now Pat. No. 8,311,294, which is a continuation of application No. 12/138,559, filed on Jun. 13, 2008, now Pat. No. 7,587,070, which is a continuation-in-part of application No. 11/534,667, filed on Sep. 24, 2006, now Pat. No. 7,450,740.

(60) Provisional application No. 61/262,528, filed on Nov. 18, 2009, provisional application No. 61/016,800, filed on Dec. 26, 2007, provisional application No. 60/721,226, filed on Sep. 28, 2005.

(51) Int. Cl.
*G06K 9/62* (2006.01)

(52) U.S. Cl.
USPC .......................................................... 382/225

(58) Field of Classification Search
None
See application file for complete search history.

(56) References Cited

U.S. PATENT DOCUMENTS

| | | | |
|---|---|---|---|
| 3,805,238 | A | 4/1974 | Rothfjell |
| 4,020,463 | A | 4/1977 | Himmel |
| 4,712,103 | A | 12/1987 | Gotanda |
| 4,858,000 | A | 8/1989 | Lu |
| 4,975,969 | A | 12/1990 | Tal |
| 5,031,228 | A | 7/1991 | Lu |
| 5,063,603 | A | 11/1991 | Burt |
| 5,164,992 | A | 11/1992 | Turk et al. |
| 5,386,103 | A | 1/1995 | DeBan et al. |
| 5,432,864 | A | 7/1995 | Lu et al. |

(Continued)

OTHER PUBLICATIONS

Adler, Automatic Face Recognition System Architecture for Collaborative Virtual Environments, 07-7803-7635-8/02 IEEE, 2002, pp. 1-6.

(Continued)

*Primary Examiner* — Nirav G Patel
(74) *Attorney, Agent, or Firm* — Clause Eight IPS; Michael Catania

(57) ABSTRACT

A system and method for tagging an image of an individual in a plurality of photos is disclosed herein. A feature vector of an individual is used to analyze a set of photos on a social networking website such as www.facebook.com to determine if an image of the individual is present in a photo of the set of photos. Photos having an image of the individual are tagged preferably by listing a URL or URI for each of the photos in a database.

5 Claims, 9 Drawing Sheets

(56) References Cited

U.S. PATENT DOCUMENTS

| | | |
|---|---|---|
| 6,035,055 A | 3/2000 | Wang et al. |
| 6,072,894 A | 6/2000 | Payne |
| 6,111,517 A | 8/2000 | Atick et al. |
| 6,134,044 A | 10/2000 | Gdovin et al. |
| 6,292,575 B1 | 9/2001 | Bortolussi et al. |
| 6,345,275 B2 | 2/2002 | Lee |
| 6,430,306 B2 | 8/2002 | Slocum et al. |
| 6,675,145 B1 | 1/2004 | Yehia et al. |
| 6,765,470 B2 | 7/2004 | Shinzaki |
| 6,792,401 B1 | 9/2004 | Nigro et al. |
| 6,882,741 B2 | 4/2005 | Dobashi et al. |
| 6,919,892 B1 | 7/2005 | Cheiky et al. |
| 6,961,466 B2 | 11/2005 | Imagawa et al. |
| 6,970,580 B2 | 11/2005 | Kies |
| 6,976,629 B2 | 12/2005 | Carlson |
| 7,039,221 B1 | 5/2006 | Tumey et al. |
| 7,050,635 B2 | 5/2006 | Javidi et al. |
| 7,095,879 B2 | 8/2006 | Yan et al. |
| 7,123,754 B2 | 10/2006 | Matsuo et al. |
| 7,123,783 B2 | 10/2006 | Gargesha et al. |
| 7,124,066 B2 | 10/2006 | Marschner et al. |
| 7,127,086 B2 | 10/2006 | Yuasa et al. |
| 7,127,087 B2 | 10/2006 | Huang et al. |
| 7,130,454 B1 | 10/2006 | Berube et al. |
| 7,221,931 B2 | 5/2007 | Benco et al. |
| 7,369,685 B2 | 5/2008 | DeLean |
| 7,428,321 B1 | 9/2008 | Shah et al. |
| 7,450,740 B2 | 11/2008 | Shah et al. |
| 7,519,200 B2 | 4/2009 | Gokturk et al. |
| 7,529,411 B2 | 5/2009 | Haupt et al. |
| 7,551,755 B1 | 6/2009 | Steinberg et al. |
| 7,565,139 B2 | 7/2009 | Neven, Sr. et al. |
| 7,587,070 B2 | 9/2009 | Myers et al. |
| 7,599,527 B2 | 10/2009 | Shah et al. |
| 7,668,348 B2 | 2/2010 | Shah et al. |
| 7,751,805 B2 | 7/2010 | Neven et al. |
| 7,760,917 B2 | 7/2010 | Vanhoucke et al. |
| 7,831,069 B2 | 11/2010 | Shah et al. |
| 7,885,435 B2 | 2/2011 | Shah et al. |
| 7,962,128 B2 | 6/2011 | Neven et al. |
| 8,199,980 B2 | 6/2012 | Shah et al. |
| 8,311,289 B2 | 11/2012 | Vanhoucke et al. |
| 8,311,294 B2 | 11/2012 | Myers et al. |
| 8,369,570 B2 | 2/2013 | Myers et al. |
| 8,421,872 B2 | 4/2013 | Neven, Sr. |
| 2002/0118195 A1 | 8/2002 | Paetzold et al. |
| 2003/0034978 A1 | 2/2003 | Buddemeier et al. |
| 2004/0151349 A1 | 8/2004 | Milne et al. |
| 2005/0043897 A1 | 2/2005 | Meyer |
| 2005/0058320 A1 | 3/2005 | Rhoads et al. |
| 2005/0076004 A1 | 4/2005 | Yanagisawa et al. |
| 2005/0084154 A1 | 4/2005 | Li et al. |
| 2005/0097131 A1 | 5/2005 | Benco et al. |
| 2005/0162523 A1 | 7/2005 | Darrell et al. |
| 2005/0182729 A1 | 8/2005 | Kananen |
| 2005/0185060 A1 | 8/2005 | Neven |
| 2005/0275506 A1 | 12/2005 | Otsuka |
| 2006/0012677 A1 | 1/2006 | Neven et al. |
| 2006/0018522 A1 | 1/2006 | Sunzeri et al. |
| 2006/0050933 A1 | 3/2006 | Adam et al. |
| 2006/0251292 A1* | 11/2006 | Gokturk et al. ............ 382/103 |
| 2009/0060289 A1 | 3/2009 | Shah et al. |
| 2010/0172550 A1* | 7/2010 | Gilley et al. ................ 382/118 |
| 2011/0182485 A1 | 7/2011 | Shochat et al. |
| 2013/0070976 A1 | 3/2013 | Myers et al. |
| 2013/0142402 A1 | 6/2013 | Myers et al. |

OTHER PUBLICATIONS

Al-Baker et al., A GPRS-Based Remote Human Face Identification System for Handheld Devices, 0-7803-9019-9/05, IEEE 2005.

Meng et al., A Highg Performance Face Recognition System Based on a Huge Face Database, 0-7803-9091-01/05, IEEE 2005, pp. 5159-5164.

Adler, Can images be regenerated from Biometric Templates, Biometrics Conference, Sep. 22-24, 2003.

Wang et al., Application of the fuzzy logic in contest-based image retrieval, Journal of Computer Science & Technology, Apr. 1, 2005.

Zhang et al., Automated Annotation of Human Faces in Family Albums, MM'03, Nov. 2-8, 2003 pp. 355-358, Berkeley, California, pp. 355-358.

Celebi et al., Content-based Image Retrieval Incorporating Models of Human Perception, Proceedings of the International Conference on Information Technology: Coding and Computing. 07695-2108-08/04, IEEE 2004.

Uchihashi et al., Content-Free Image Retrieval Based on Relations Exploited From user Feedbacks, 0-7803-9332-5/05, IEEE 2005.

Aslandogan et al., Evaluating Stratgies and Systems For Content Based Indexing of Person Images on the Web, ACM Multimedia 2000, Los Angeles, California, 2000, pp. 313-321.

Weinstein et al., Handheld Face Identification Technology in a Pervasive Computing Environment, Pervasive 2002, Zurich, Switzerland, 2002.

Wood et al., Iterative Refinement by Relavance Feedback in Content Based Digital Image Retrieval. ACM Multimedia'98, Bristol Kingdom, 1998, pp. 13-20.

Girgensohn et al., Leveraging Face Recognition Technoloy to Find and Organize Photos, MIR'04, Oct. 15-16, 2004, New York, New York, 2004, pp. 99-106

Song et al., Online Face Recognition System Through the Internet, 0-7803-8603-5/04, IEEE 2004, pp. 1207-1210.

Cox et al., Bayesian Relevance Feedback for Image Retrieval, Forum on research and Technology Advances in Digital Libraries. ADL'96, 1996.

Complaint, *FaceDouble* v. *Coca Cola*, case No. 10-cv-0485 IEG RBB, Mar. 5, 2010.

Plaintiff's Answer to Defendant Crispin's Counterclaim, *FaceDouble* v. *Coca Cola*, case No. 10-cv-0485 IEG RBB, May 18, 2010.

Plaintiff's Answer to Defendant Coca-Cola's Counterclaim, *FaceDouble* v. *Coca Cola*, case No. 10-cv-0485 IEG RBB, May 18, 2010.

Plaintiff's Response to Motion to Continue Preliminary Injunction, *FaceDouble* v. *Coca Cola*, case No. 10-cv-0485 IEG RBB, Apr. 12, 2010.

Defendants' Memorandum in Support of Motion to Continue Preliminary Injunction, *FaceDouble* v. *Coca Cola*, case No. 10-cv-0485 IEG RBB, Jun. 22, 2010.

Plaintiff's Motion for Preliminary Injunction, *FaceDouble* v. *Coca Cola*, case No. 10-cv-0485 IEG RBB, Apr. 29, 2010.

Defendant Crispin's Answer, Affirmative Defenses and Counterclaims, *FaceDouble* v. *Coca Cola*, case No. 10-cv-0485 IEG RBB, Apr. 29, 2010.

Defendant Coca-Cola's Answer and Counterclaims, *FaceDouble* v. *Coca Cola*, case No. 10-cv-0485 IEG RBB, Apr. 29, 2010.

Defendant's Opposition to the Motion for Preliminary Injunction, *FaceDouble* v. *Coca Cola*, case No. 10-cv-0485 IEG RBB, Jun. 22, 2010.

Final Office Action for U.S. Appl. No. 13/252,139, mailed on Mar. 22, 2013.

\* cited by examiner

METHOD AND SYSTEM FOR ATTACHING A METATAG TO A DIGITAL IMAGE

CROSS REFERENCE TO RELATED APPLICATION

The Present Application claims priority to U.S. Provisional Patent No. 61/262,528, filed on Nov. 18, 2009, is a continuation-in-part application of U.S. patent application Ser. No. 12/341,318, filed on Dec. 22, 2008, which claims priority to U.S. Provisional Patent No. 61/016,800, filed on Dec. 26, 2007, now abandoned, and is a continuation-in-part application of U.S. patent application Ser. No. 12/555,789, filed on Sep. 8, 2009, which is a continuation application of U.S. patent application Ser. No. 12/138,559, filed on Jun. 13, 2008, now U.S. Pat. No. 7,587,070, which is a continuation-in-part application of U.S. patent application Ser. No. 11/534,667, filed on Sep. 24, 2006, now U.S. Pat. No. 7,450,740, which claims priority to U.S. Provisional Patent Application No. 60/721,226, filed Sep. 28, 2005, now abandoned, all of which are hereby incorporated by reference in their entireties.

STATEMENT REGARDING FEDERALLY SPONSORED RESEARCH OR DEVELOPMENT

Not Applicable

BACKGROUND OF THE INVENTION

1. Field of the Invention

The present invention relates to a method and system for meta-tagging a collection of digital photos containing an image of an individual or individuals.

2. Description of the Related Art

Classification of facial images using feature recognition software is currently used by various government agencies such as the Department of Homeland Security (DHS) and the Department of Motor Vehicles (DMV) for detecting terrorists, detecting suspected cases of identity fraud, automating border and passport control, and correcting mistakes in their respective facial image databases. Facial images stored in the DMV or DHS are digitized and stored in centralized databases, along with associated information on the person. Examples of companies that provide biometric facial recognition software include Cross Match Technologies, Cognitec, Cogent Systems, and Iridian Technologies; of these, Cognitec also provides a kiosk for digitally capturing images of people for storage into their software.

Your face is an important part of who you are and how people identify you. Imagine how hard it would be to recognize an individual if all faces looked the same. Except in the case of identical twins, the face is arguably a person's most unique physical characteristic. While humans have had the innate ability to recognize and distinguish different faces for millions of years, computers are just now catching up.

Visionics, a company based in New Jersey, is one of many developers of facial recognition technology. The twist to its particular software, FACEIT, is that it can pick someone's face out of a crowd, extract that face from the rest of the scene and compare it to a database full of stored images. In order for this software to work, it has to know what a basic face looks like. Facial recognition software is based on the ability to first recognize faces, which is a technological feat in itself, and then measure the various features of each face.

If you look in the mirror, you can see that your face has certain distinguishable landmarks. These are the peaks and valleys that make up the different facial features. Visionics defines these landmarks as nodal points. There are about 80 nodal points on a human face. A few of the nodal points that are measured by the FACEIT software: distance between eyes; width of nose; depth of eye sockets; cheekbones; Jaw line; and chin. These nodal points are measured to create a numerical code that represents the face in a database. This code is referred to as a faceprint and only fourteen to twenty-two nodal points are necessary for the FACEIT software to complete the recognition process.

Facial recognition methods may vary, but they generally involve a series of steps that serve to capture, analyze and compare your face to a database of stored images. The basic process that is used by the FACEIT software to capture and compare images is set forth below and involves Detection, Alignment, Normalization, Representation, and Matching. To identify someone, facial recognition software compares newly captured images to databases of stored images to see if that person is in the database.

Detection is when the system is attached to a video surveillance system, the recognition software searches the field of view of a video camera for faces. If there is a face in the view, it is detected within a fraction of a second. A multi-scale algorithm is used to search for faces in low resolution. The system switches to a high-resolution search only after a head-like shape is detected.

Alignment is when a face is detected, the system determines the head's position, size and pose. A face needs to be turned at least thirty-five degrees toward the camera for the system to register the face.

Normalization is when the image of the head is scaled and rotated so that the head can be registered and mapped into an appropriate size and pose. Normalization is performed regardless of the head's location and distance from the camera. Light does not impact the normalization process.

Representation is when the system translates the facial data into a unique code. This coding process allows for easier comparison of the newly acquired facial data to stored facial data.

Matching is when the newly acquired facial data is compared to the stored data and linked to at least one stored facial representation.

The heart of the FACEIT facial recognition system is the Local Feature Analysis (LFA) algorithm. This is the mathematical technique the system uses to encode faces. The system maps the face and creates the faceprint. Once the system has stored a faceprint, it can compare it to the thousands or millions of faceprints stored in a database. Each faceprint is stored as an 84-byte file.

One of the first patents related to facial recognition technology is Rothfjell, U.S. Pat. No. 3,805,238 for a Method For Identifying Individuals using Selected Characteristics Body Curves. Rothfjell teaches an identification system in which major features (e.g. the shape of a person's nose in profile) are extracted from an image and stored. The stored features are subsequently retrieved and overlaid on a current image of the person to verify identity.

Another early facial recognition patent is Himmel, U.S. Pat. No. 4,020,463 for an Apparatus And A Method For Storage And Retrieval Of Image Patterns. Himmel discloses digitizing a scanned image into binary data which is then compressed and then a sequence of coordinates and vector values are generated which describe the skeletonized image. The coordinates and vector values allow for compact storage of the image and facilitate regeneration of the image.

Yet another is Gotanda, U.S. Pat. No. 4,712,103 for a Door Lock Control System. Gotanda teaches, inter alia, storing a digitized facial image in a non-volatile ROM on a key, and retrieving that image for comparison with a current image of the person at the time he/she request access to a secured area. Gotanda describes the use of image compression, by as much as a factor of four, to reduce the amount of data storage capacity needed by the ROM that is located on the key.

Yet another is Lu, U.S. Pat. No. 4,858,000. Lu teaches an image recognition system and method for identifying ones of a predetermined set of individuals, each of whom has a digital representation of his or her face stored in a defined memory space.

Yet another is Tal, U.S. Pat. No. 4,975,969. Tal teaches an image recognition system and method in which ratios of facial parameters (which Tal defines a distances between definable points on facial features such as a nose, mouth, eyebrow etc.) are measured from a facial image and are used to characterize the individual. Tal, like Lu in U.S. Pat. No. 4,858,000, uses a binary image to find facial features.

Yet another is Lu, U.S. Pat. No. 5,031,228. Lu teaches an image recognition system and method for identifying ones of a predetermined set of individuals, each of whom has a digital representation of his or her face stored in a defined memory space. Face identification data for each of the predetermined individuals are also stored in a Universal Face Model block that includes all the individual pattern images or face signatures stored within the individual face library.

Still another is Burt, U.S. Pat. No. 5,053,603. Burt teaches an image recognition system using differences in facial features to distinguish one individual from another. Burt's system uniquely identifies individuals whose facial images and selected facial feature images have been learned by the system. Burt's system also "generically recognizes" humans and thus distinguishes between unknown humans and non-human objects by using a generic body shape template.

Still another is Turk et al., U.S. Pat. No. 5,164,992. Turk teaches the use of an Eigenface methodology for recognizing and identifying members of a television viewing audience. The Turk system is designed to observe a group of people and identify each of the persons in the group to enable demographics to be incorporated in television ratings determinations.

Still another is Deban et al., U.S. Pat. No. 5,386,103. Deban teaches the use of an Eigenface methodology for encoding a reference face and storing said reference face on a card or the like, then retrieving said reference face and reconstructing it or automatically verifying it by comparing it to a second face acquired at the point of verification. Deban teaches the use of this system in providing security for Automatic Teller Machine (ATM) transactions, check cashing, credit card security and secure facility access.

Yet another is Lu et al., U.S. Pat. No. 5,432,864. Lu teaches the use of an Eigenface methodology for encoding a human facial image and storing it on an "escort memory" for later retrieval or automatic verification. Lu teaches a method and apparatus for employing human facial image verification for financial transactions.

Technologies provided by wireless carriers and cellular phone manufacturers enable the transmission of facial or object images between phones using Multimedia Messaging Services (MMS) as well as to the Internet over Email (Simple Mail Transfer Protocol, SMTP) and Wireless Access Protocol (WAP). Examples of digital wireless devices capable of capturing and receiving images and text are camera phones provided by Nokia, Motorola, LG, Ericsson, and others. Such phones are capable of handling images as JPEGs over MMS, Email, and WAP across many of the wireless carriers: Cingular, T-Mobile, (GSM/GPRS), and Verizon (CDMA) and others.

Neven, U.S. Patent Publication 2005/0185060, for an Image Base Inquiry system For Search Engines For Mobile Telephones With Integrated Camera, discloses a system using a mobile telephone digital camera to send an image to a server that converts the image into symbolic information, such as plain text, and furnishes the user links associated with the image which are provided by search engines.

Neven, et al., U.S. Patent Publication 2006/0012677, for an Image-Based Search Engine For Mobile Phones With Camera, discloses a system that transmits an image of an object to a remote server which generates three confidence values and then only generates a recognition output from the three confidence values, with nothing more. I Adam et al., U.S. Patent Publication 2006/0050933, for a Single Image Based Multi-Biometric System And Method which integrates face, skin and iris recognition to provide a biometric system.

The general public has a fascination with celebrities and many members of the general public use celebrities as a standard for judging some aspect of their life. Many psychiatrists and psychologists believe the confluence of forces coming together in technology and media have led to this celebrity worship factor in our society. One output of this celebrity factor has been a universal approach to compare or determine that someone looks like a certain celebrity. People are constantly stating that someone they meet or know looks like a celebrity, whether it is true or not. What would be helpful would be to scientifically provide a basis for someone to lay claim as looking like a certain celebrity.

BRIEF SUMMARY OF THE INVENTION

The present invention provides a novel method and system for tagging digital photos containing an image of an individual or individuals. The system and method can be used to organize a collection of digital photos posted on a social networking web site such as facebook.com.

A feature vector is created for an individual from one or more digital photos. This feature vector is then utilized to search a database of digital photos and tag those digital photos containing an image of the individual as determined by a match to the feature vector. The database of digital photos may be stored on a social networking web site such as myspace.com or www.facebook.com. The meta-tagging of a digital photo comprises marking the location (X-Y coordinate in the digital photo, size in the digital photo, and tilt in the digital photo) and storing this facial location information along with a unique identification reference for the individual, and a unique identification reference for the digital photo (this can be a URL or URI for the digital photo if on a web site). The actual digital photo is not modified in any manner.

The digital image is preferably captured by a wireless communication device (preferably a mobile telephone) or from a personal computer (PC). The image is preferably in a JPEG, TIFF, GIF or other standard image format. Further, an analog image may be utilized if digitized. The image is sent to the wireless carrier and subsequently sent over the internet to an image classification server. Alternatively, the digital image may be uploaded to a PC from a digital camera or scanner and then sent to the image classification server over the internet.

After an image is received by the image classification server, the image is processed into a feature vector, which reduces the complexity of the digital image data into a small set of variables that represent the features of the image that are of interest for classification purposes.

The feature vector is compared against existing feature vectors in an image database to find the closest match. The image database preferably contains one or more feature vectors for each target individual.

The digital photo used for the creating a feature vector may be created in a number of different methods. The user may capture a digital image with a digital camera enabled wireless communication device, such as a mobile telephone. The compressed digital image is sent to the wireless carrier as a multimedia message (MMS), a short message service ("SMS"), an e-mail (Simple Mail Transfer Protocol ("SMTP")), or wireless application protocol ("WAP") upload. The image is subsequently sent over the internet using HTTP or e-mail to an image classification server. Alternatively, the digital image(s) may be uploaded to a PC from a digital camera, or scanner. Once on the PC, the image(s) can be transferred over the internet to the image classification server as an e-mail attachment, or HTTP upload.

After the image is received by the image classification server, a feature vector is generated for the image. A feature vector is a small set of variables that represent the features of the image that are of interest for classification purposes. Creation and comparison of features vectors may be queued, and scaled across multiple machines. Alternatively, different feature vectors may be generated for the same image. Alternatively, the feature vectors of several images of the same individual may be combined into a single feature vector. The incoming image, as well as associate features vectors, may be stored for later processing, or added to the image database. For faces, possible feature vector variables are the distance between the eyes, the distance between the center of the eyes, to the chin, the size, and shape of the eyebrows, the hair color, eye color, facial hair if any, and the like.

One aspect of the present invention is a method for tagging an image of an individual in a plurality of photos. The method includes providing a first plurality of photos. Each of the first plurality of photos comprises an identified image of the individual. The method also includes processing the image of the individual in each of the first plurality of photos to generate a feature vector for the individual. The method also includes analyzing a second plurality of photos to determine if an image of the individual is present in a photo of the second plurality of photos. The analysis comprises determining if an image in each of the photos of the second plurality of photos matches the feature vector for the individual. The method also includes identifying each of the photos of the second plurality of photos having an image of the individual to create a third plurality of photos. The method also includes tagging each of the photos of the third plurality of photos to identify the image of the individual in each of the third plurality of photos.

Another aspect of the present invention is a system for tagging an image of an individual in a plurality of photos. The system includes a network, a database, a server engine, a second plurality of photos on a social networking web site, analysis means, identification means and tagging means. The database comprises a first plurality of photos of an image of an individual. The server engine processes the first plurality of photos to generate a feature vector for the image of the individual. The analysis means analyzes the second plurality of photos to determine if an image of the individual is present in a photo of the second plurality of photos. The analysis comprises determining if an image in each of the photos of the second plurality of photos matches the feature vector for the individual. The identification means identifies each of the photos of the second plurality of photos having an image of the individual to create a third plurality of photos. The tagging means tags each of the photos of the third plurality of photos to identify the image of the individual in each of the third plurality of photos.

Yet another aspect of the present invention is a method for meta-tagging an image of an individual in a plurality of photos. The method includes providing a first plurality of photos. Each of the first plurality of photos comprises an identified image of the individual. The method also includes processing the image of the individual in each of the first plurality of photos to generate a feature vector for the individual. The method also includes analyzing a second plurality of photos to determine if an image of the individual is present in a photo of the second plurality of photos. The analysis comprises determining if an image in each of the photos of the second plurality of photos matches the feature vector for the individual. The method also includes identifying each of the photos of the second plurality of photos having an image of the individual to create a third plurality of photos. The method also includes meta-tagging each of the photos of the third plurality of photos to identify the image of the individual in each of the third plurality of photos.

Yet another aspect of the present invention is a method for tagging an image of an individual in a plurality of photos. The method includes creating a feature vector for an individual from a plurality of reference photos. The method also includes analyzing a second plurality of photos to determine if an image of the individual is present in a photo of the second plurality of photos. The analysis comprises determining if an image in each of the photos of the second plurality of photos matches the feature vector for the individual. The method also includes identifying each of the photos of the second plurality of photos having an image of the individual to create a third plurality of photos. The method also includes determining the location the location of the image in the photo. The method also includes storing the location of the image in the photo in a database. The method also includes storing an identifier for the photo in a database. The method also includes storing an identifier for the individual in a database.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
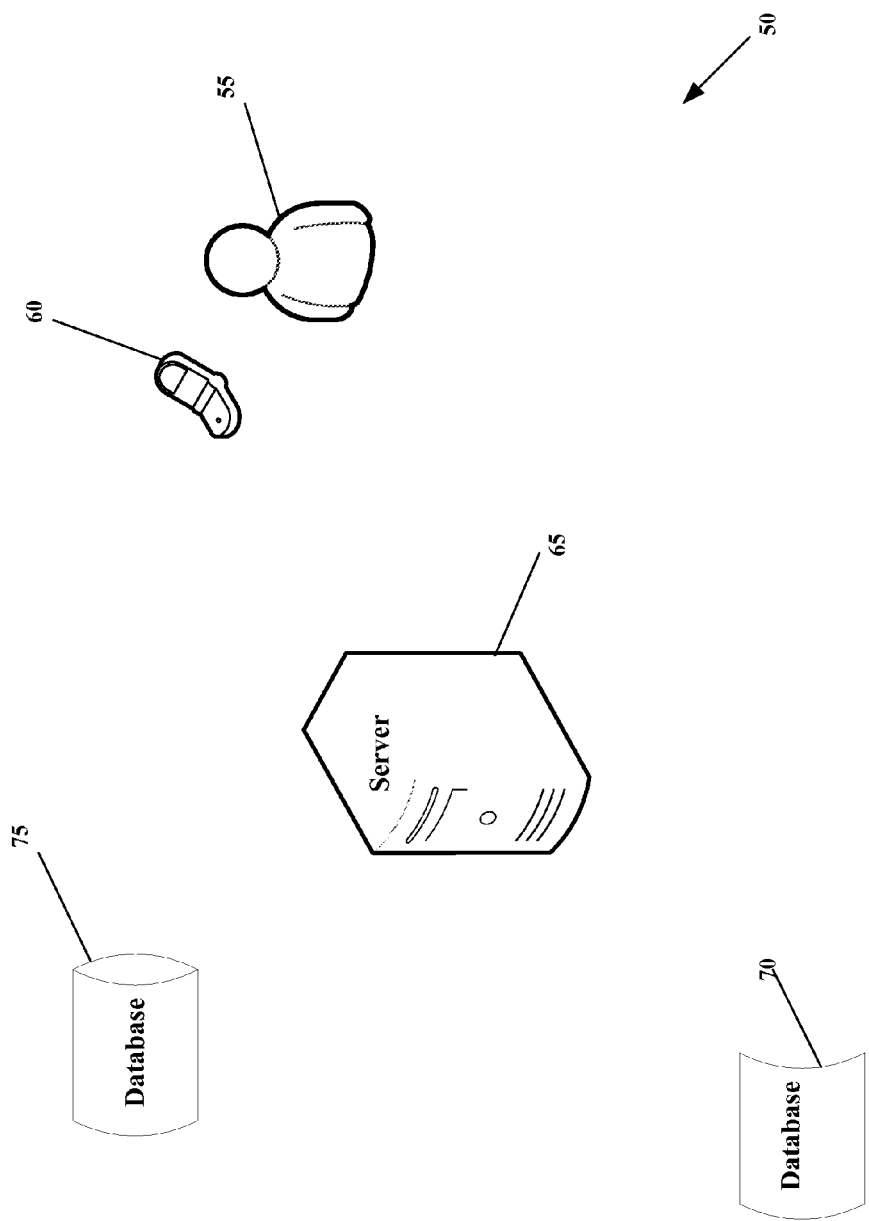
FIG. 1 is a schematic diagram of a system of the present invention.

A system 50 of the present invention is generally illustrated in FIG. 1. A user 55 can use a mobile telephone to transmit an image or images over a network to a processing server 65 for processing. Alternatively, the user 55 can use a computer to transmit the images to the processing server 65 over the internet. As discussed in more detail below, the processing server 65 creates a feature vector from the image or images. The processing server can then access a database of digital photos 75 to determine if any of the digital photos can the image. If the database photos contain the image, information is generated for each image and stored on a database 70.

Generally, a facial image is transmitted over a network to an image classification server or processing server, preferably over a wireless network. The facial image is preferably sent over the internet using HTTP or e-mail to the image classification server. The facial image, preferably a compressed digital facial image such as a JPEG image, is sent to a wireless carrier as a MMS, a SMS, a SMTP, or WAP upload. Alternatively, the facial image is uploaded to a computer from a digital camera, or scanner and then transferred over the internet to the image classification server as an e-mail attachment, or HTTP upload.

The facial image is analyzed at the image classifications server to determine if the facial image is of adequate quality to be processed for matching. Quality issues with the facial image include but are not limited to a poor pose angle, brightness, shading, eyes closed, sunglasses worn, obscured facial features, or the like. Processing of the image preferably comprises using an algorithm which includes a principle component analysis technique to process the face of the facial image into an average of a multitude of faces, otherwise known as the principle component and a set of images that are the variance from the average face image known as the additional components. Each is reconstructed by multiplying the principal components and the additional components against a feature vector and adding the resulting images together. The resulting image reconstructs the original face of the facial image. Processing of the facial image comprises factors such as facial hair, hair style, facial expression, the presence of accessories such as sunglasses, hair color, eye color, and the like. Essentially a primary feature vector is created for the facial image. This primary feature vector is compared to a plurality of database of images preferably located on a social networking website. A more detailed description of generating feature vectors is disclosed in Shah, et al., U.S. Pat. No. 7,450,740, for an Image Classification And Information Retrieval Over Wireless Digital Networks And The Internet, which is hereby incorporated by reference in its entirety.

The present invention preferably uses facial recognition software commercially or publicly available such as the FACEIT brand software from IDENTIX, the FACEVACS brand software from COGNETIC, and others. Those skilled in the pertinent art will recognize that there are many facial recognition softwares, including those in the public domain, that may be used without departing from the scope and spirit of the present invention.

The operational components of the image classification server/processing server 65 preferably include an input module, transmission engine, input feed, feature vector database, sent images database, facial recognition software, perception engine, and output module. The input module is further partitioned into wireless device inputs, e-mail inputs and HTTP (internet) inputs.

Figure 2:
FIG. 2 is a digital photo with a facial image of an individual.
Figure 3:
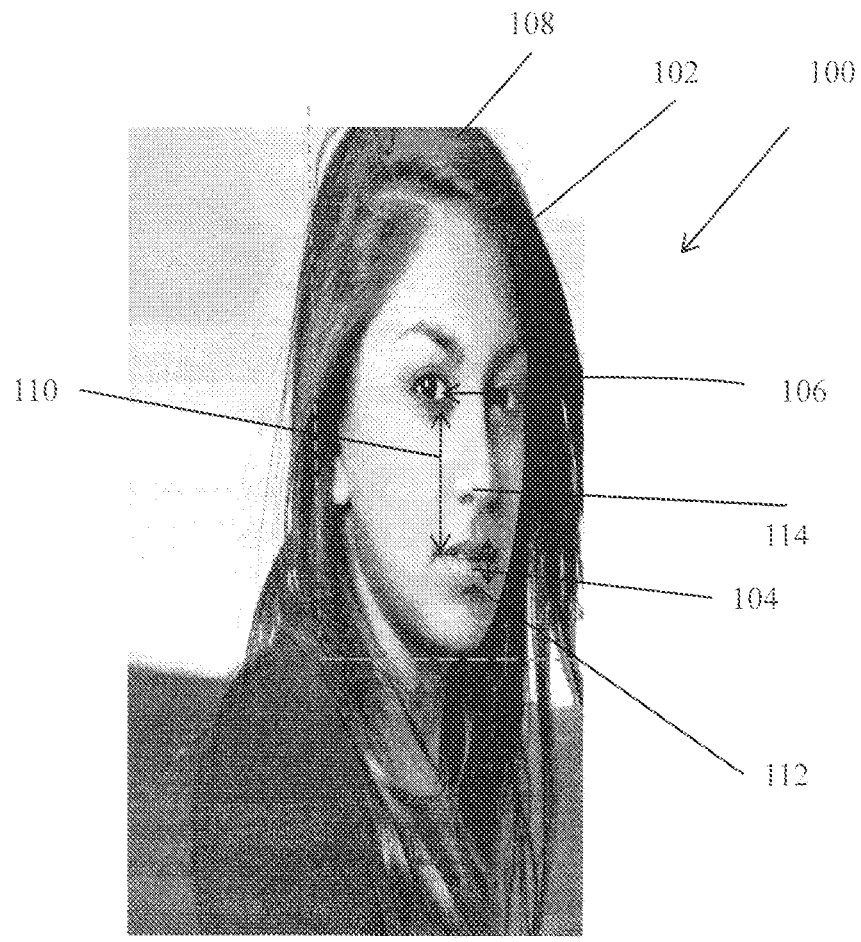
FIG. 3 is the facial image of FIG. 2 with feature vector indicators.
Figure 4:
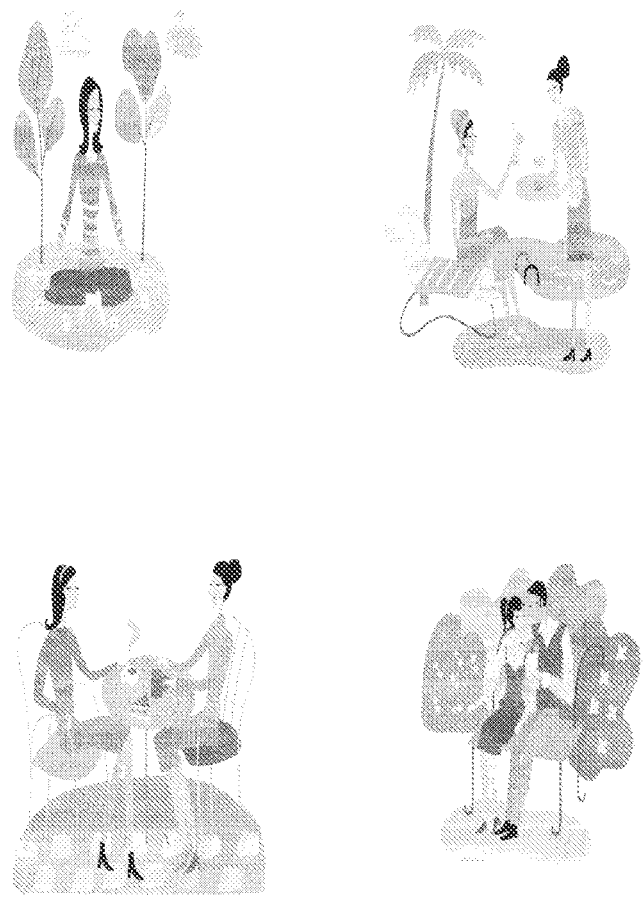
FIG. 4 is an illustration of digital photos from a social networking website.
Figure 4A:
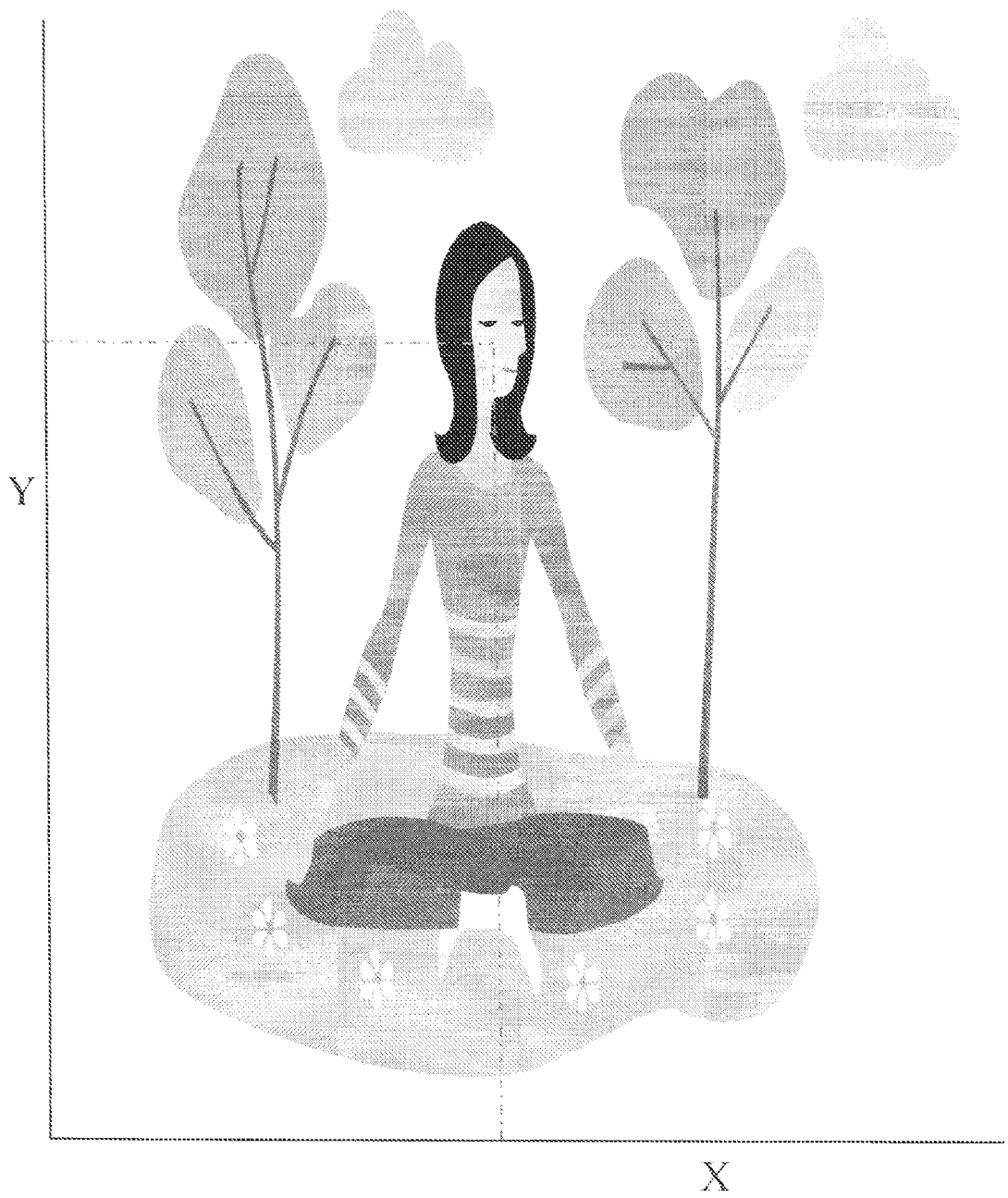
FIG. 4A is an illustration of one of the digital photos from FIG. 4 with location information illustrated.

A digital photo 100 of a facial image of an individual is shown in FIG. 2. The digital photo is sent to the processing server for creation of a feature vector for this individual. The feature vector is generated based on facial features, and this allows the image of the individual to be distinguished within other digital photos. Such features include the hair color 102, face shape 104, distance between eyes 106, hair style 108, distance between eyes and mouth 110, length of mouth 112 and nose shape 114, and other like features. The primary feature vector is then used to identify other digital photos bearing an image of the individual. As shown in FIG. 4, a collection of digital photos bearing an image of the individual are identified. In FIG. 4A, a particular photo bearing an image of the individual is analyzed for location information which is preferably stored in a database 70. An X-Y position of the image is determined, along with the size of the image and tilt angle. This allows image to be quickly identified.

Figure 5:
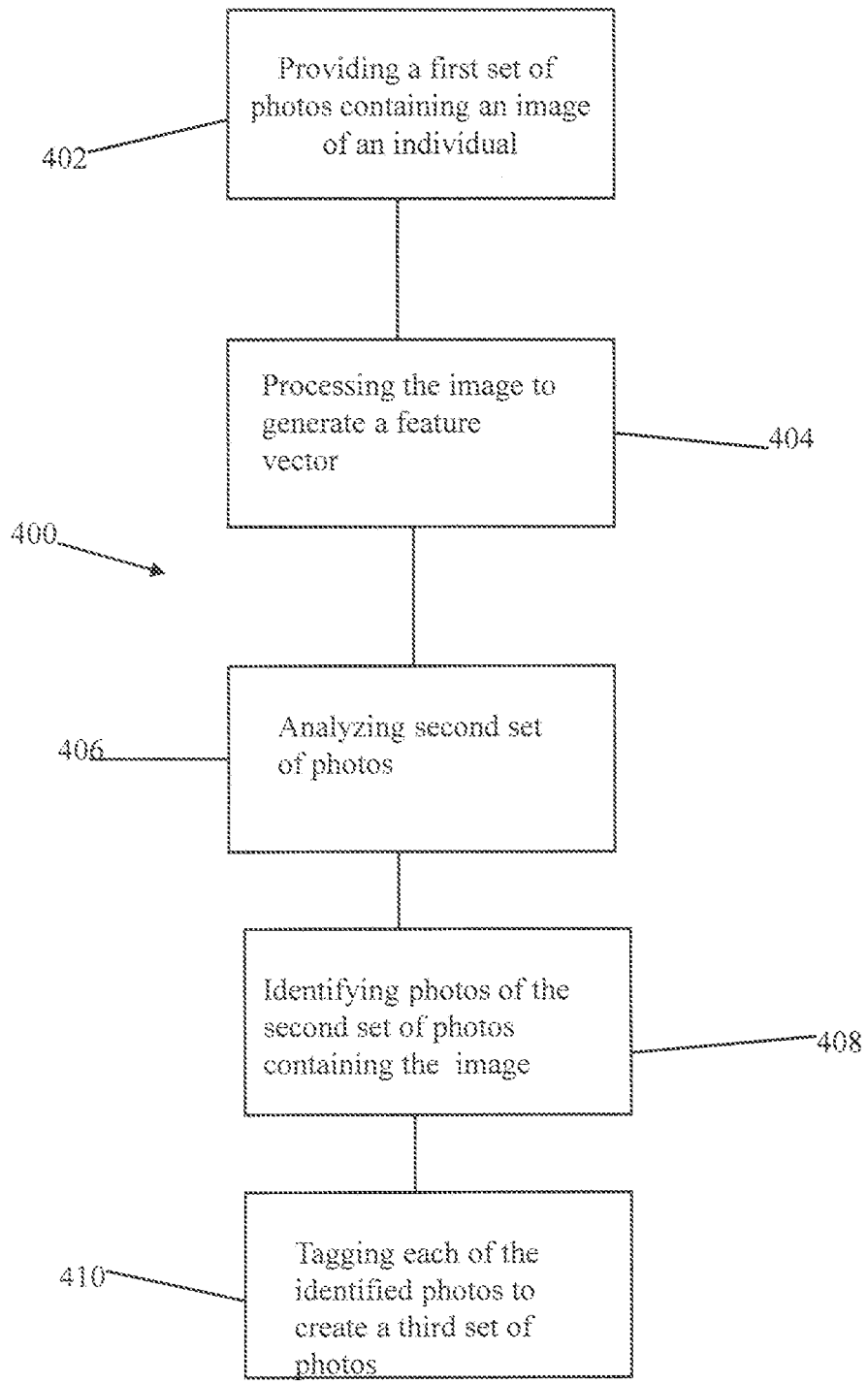
FIG. 5 is a flow chart of a specific method of the present invention.

A method 400 for tagging an image of an individual in a plurality of photos is shown in FIG. 5. In this method, at block 402, a first set of digital photos is provided with each of the digital photos containing an image of an individual. The first set of photos is preferably provided to a processing server over a network. At block 404, the image or images of the individual is/are processed, preferably at the processing server, to generate a feature vector for the image(s) of the individual. At block 406, a second set of photos is analyzed, preferably by the server, to determine if any of the photos of the second set of photos has an image that matches the feature vector. The second set of photos is preferably located on a social networking website, such as myspace.com, or facebook.com. At block 408, photos of the second set of photos that contain an image that matches the feature vector are identified, preferably by the processing server. At block 410, these identified photos are tagged to create a third set of photos.

Figure 6:
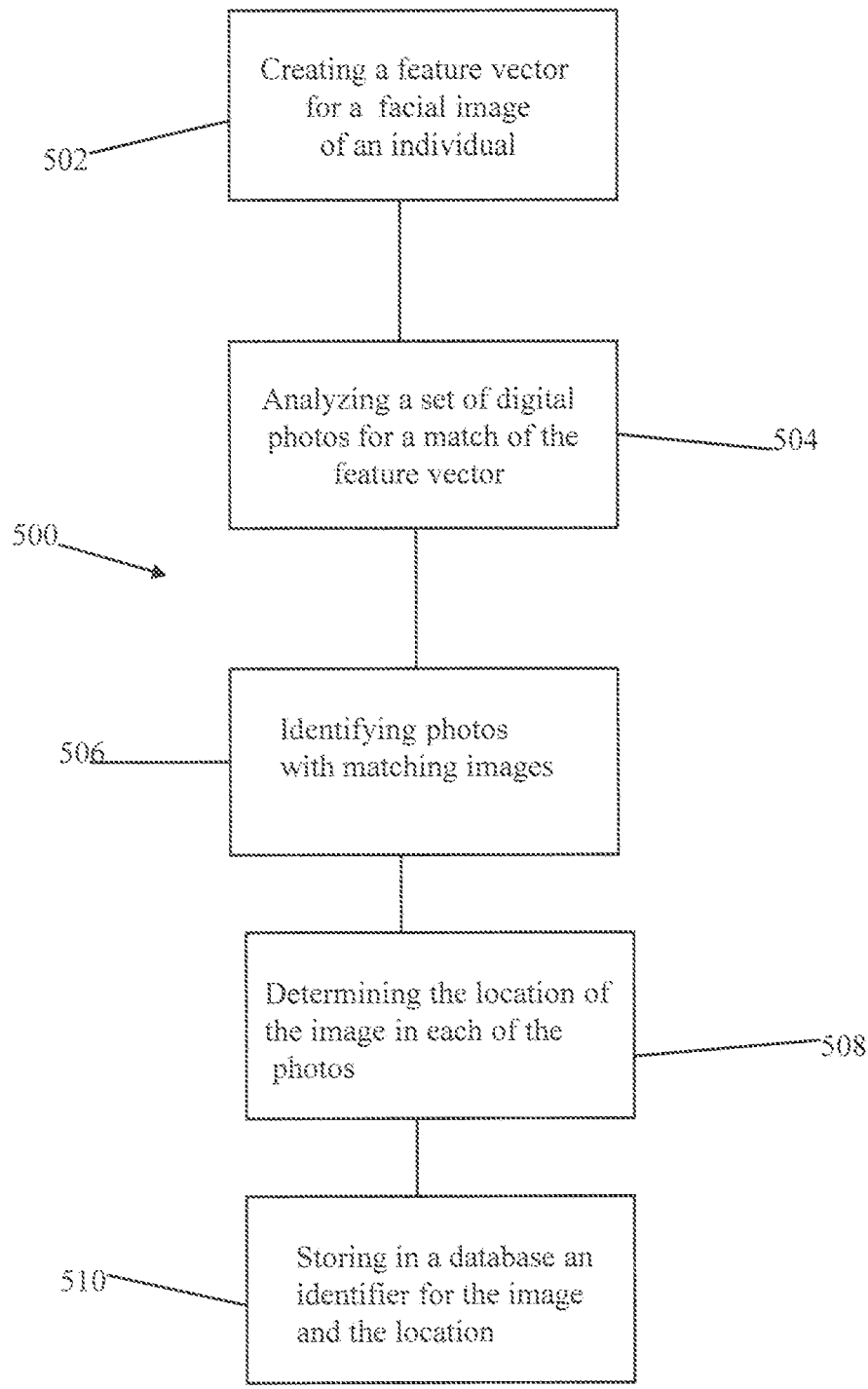
FIG. 6 is a flow chart of a specific method of the present invention.

A method 500 for tagging a facial image of an individual in a plurality of digital photos, is shown in FIG. 6. For example, a user may want to create links to unorganized digital photos bearing an image of an individual or group of individuals. The present method allows the user to create such links. At block 502, a feature vector for a facial image of an individual is created at a processing server. The feature vector is preferably created from a first set of photos containing the facial image of the individual. At block 504, a second set of digital photos is analyzed, preferably by the processing server, to determine if any of the digital photos of the second set of photos has a facial image that matches the feature vector. The second set of photos is preferably located on a social networking website, such as myspace.com, or facebook.com. At block 506, photos of the second set of photos that contain an image that matches the feature vector are identified, preferably by the processing server. At block 508, the location information of the facial image in each of the second set of digital photos is determined by the processing server. The location information is preferably the X and Y coordinates, the size of the facial image and the tilt angle of the facial image in the digital photo. At block 510, an identifier and the location information of the facial image for each of the identified digital photos is stored on a database, preferably at the processing server.

Figure 7:
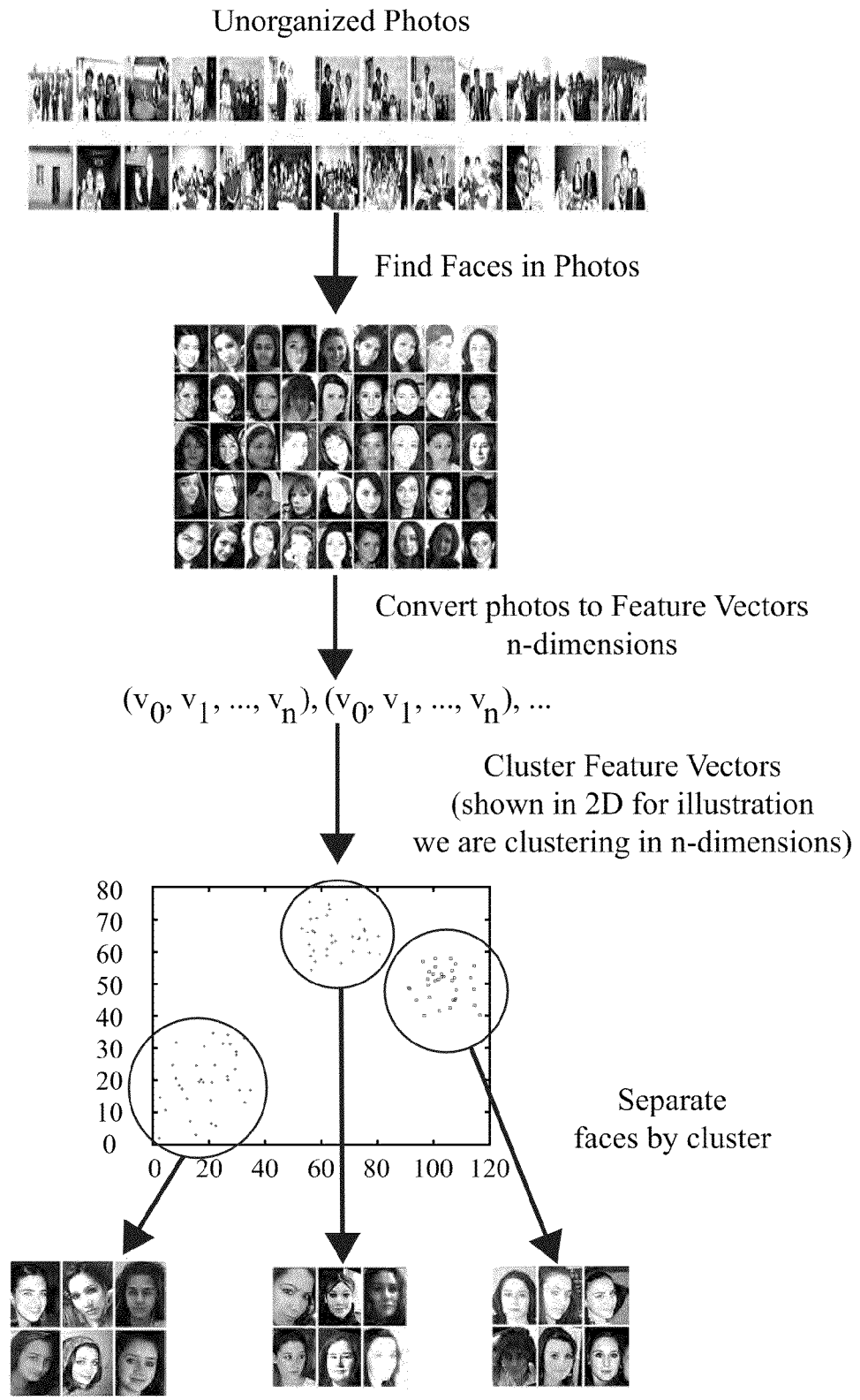
FIG. 7 is a flow chart.
Figure 7A:
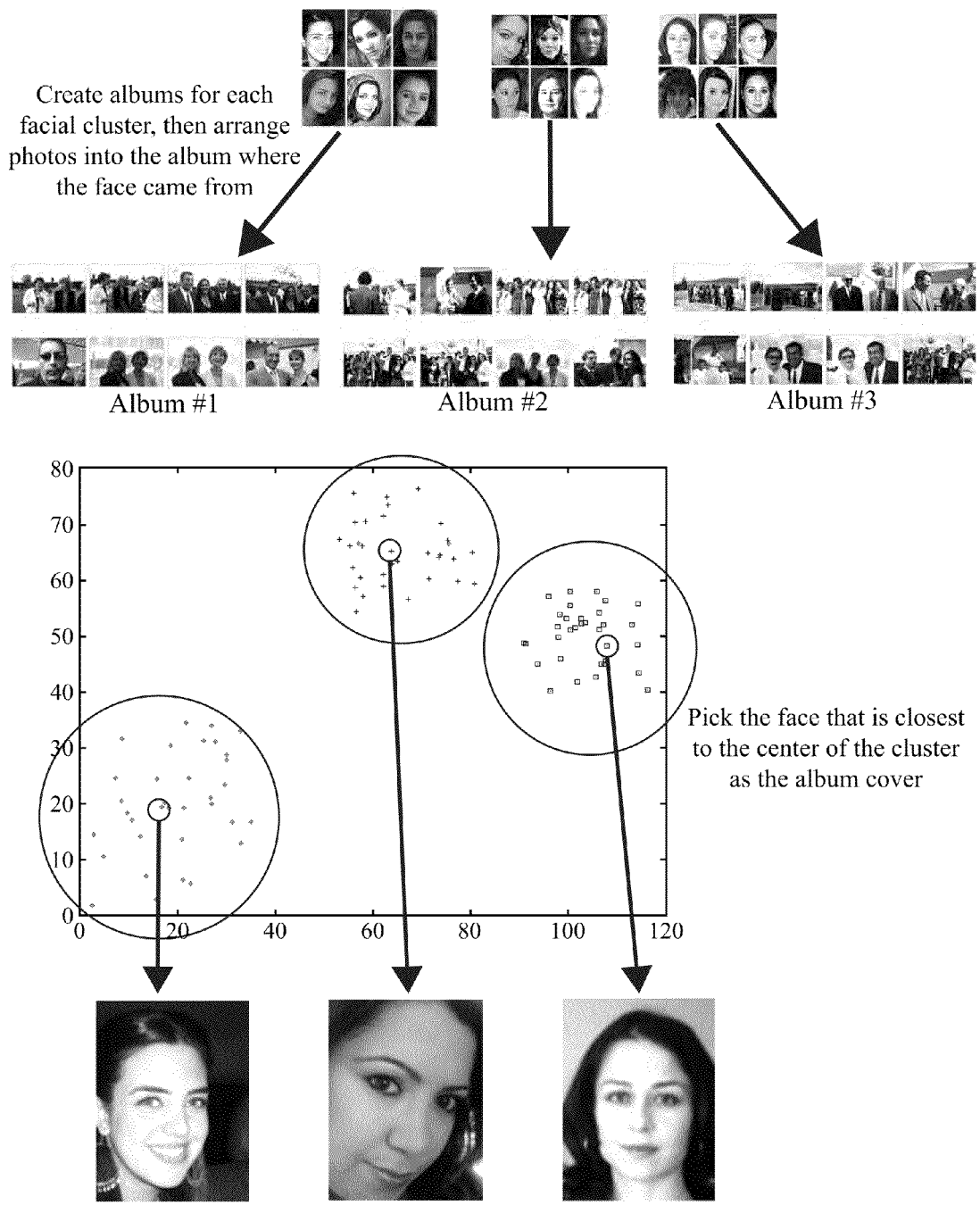
FIG. 7A is a continuation of the flow chart of FIG. 7.

FIGS. 7 and 7A illustrate a method of organizing a plurality of digital photos.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention:

1. A method for tagging an image of an individual in a plurality of photos, the method comprising:
   identifying a plurality of faces in a plurality of photos;
   converting each of the plurality of photos into a plurality of feature vectors, each of the plurality of feature vectors having n-dimensions, wherein each of the plurality feature vectors is based on a plurality of factors comprising facial expression, hair style, hair color, facial pose, eye color, texture of the face, color of the face and facial hair;
   clustering each of the plurality of feature vectors;
   separating each of the plurality of faces by a cluster;
   creating a plurality of albums for each facial cluster;
   arranging each of the plurality of photos into an album of the plurality of albums where each face from a photo originated; and
   choosing a face that is closest to a center of each facial cluster as an album cover for the facial cluster.

2. The method according to claim 1 further comprising tagging by listing a URL or URI for each of the photos of the plurality of photos in a database.

3. The method according to claim 1 further comprising tagging by inserting a tag code on each of the photos of the plurality of photos.

4. The method according to claim 1 wherein the image of the individual is a facial image of the individual.

5. The method according to claim 1 further comprising:
   determining X and Y coordinates of each of the plurality of faces in each photo of the plurality of photos;
   determining the size of the face of each photo of the plurality of photos;
   determining the tilt of the face of each photo of the plurality of photos;
   storing in a database the X and Y coordinates of the face in each photo of the plurality of photos; and
   storing in the database an identifier for each photo of the plurality of photos.

* * * * *